US008386308B2

(12) United States Patent
Kansal et al.

(10) Patent No.: US 8,386,308 B2
(45) Date of Patent: *Feb. 26, 2013

(54) TARGETING CONTENT CREATION REQUESTS TO CONTENT CONTRIBUTORS

(75) Inventors: Abhishekh S. Kansal, Denver, CO (US); Luke B. Beatty, Denver, CO (US); Kirsten A. Kahn, Denver, CO (US); Jason W. Curran, Denver, CO (US); Andrew R. Martinez, Aurora, CO (US)

(73) Assignee: Yahoo! Inc., Sunnyvale, CA (US)

( * ) Notice: Subject to any disclaimer, the term of this patent is extended or adjusted under 35 U.S.C. 154(b) by 10 days.

This patent is subject to a terminal disclaimer.

(21) Appl. No.: 12/723,602

(22) Filed: Mar. 12, 2010

(65) Prior Publication Data

US 2011/0225290 A1    Sep. 15, 2011

(51) Int. Cl.
*G06Q 30/00*    (2012.01)
(52) U.S. Cl. .................... 705/14.19; 705/14.16
(58) Field of Classification Search .......... 709/204, 709/224, 217; 705/14.19, 14.16, 59, 22; 701/211; 725/146
See application file for complete search history.

(56) References Cited

U.S. PATENT DOCUMENTS

| 2006/0095331 | A1* | 5/2006 | O'Malley et al. | 705/22 |
| 2007/0250901 | A1* | 10/2007 | McIntire et al. | 725/146 |
| 2009/0119013 | A1* | 5/2009 | O'Malley | 701/211 |
| 2011/0191246 | A1* | 8/2011 | Brandstetter et al. | 705/59 |
| 2011/0225239 | A1* | 9/2011 | Kansal et al. | 709/204 |

* cited by examiner

*Primary Examiner* — Le H Luu
(74) *Attorney, Agent, or Firm* — Martine Penilla Group, LLP

(57) ABSTRACT

An assignment system and method for generating content creation requests or "assignments" and targeting assignments to content contributors. The assignment system is part of a content distribution system that aggregates, manages, and distributes/syndicates multimedia content that is generated by content contributors. As part of the acquisition of content, the assignment system may compensate the content contributors for the content that they provide to the system. The assignment system generates assignments that are likely to result in content that will be of interest to content consumers. The assignment system targets the generated assignments to content contributors that are well-suited to generate content that will be successful among a target audience. The assignment system notifies those contributors of available assignments and allows contributors to claim assignments to fulfill. The assignment system also manages the flow of content submissions and verifies that submitted content meets the assignment's requirements.

30 Claims, 15 Drawing Sheets

524

Your Interests & Areas of Expertise
(Separate each topic with a comma and space)
[Reading, writing, movies, gardening]

Your Photo
Current   Upload your own
 [            ] (Browse...)
Format: Image must be in .jpg or .gif format and must comply with our image guidelines.

526

Your Affiliations (Blogs, online profiles, professional organizations, etc.)
Name [            ]
URL  [            ]

Name [            ]
URL  [            ]

Name [            ]
URL  [            ]

Your Custom URL
www.associatedcontent.com/[      ]

528

Your Experience / Education
(Schools, degrees, professional history, etc.)
[High School, Some College]

Your Motto
[            ]

OpenID URL (p)
[            ]

Date of Birth (p)
[  ]/[  ]/[    ] mm/dd/yyyy

Resident and/or citizen of (p)
[United States of America ▼]

Street Address (p)
[            ]
[            ]

City
[            ]

State
[        ▼]

**Zip / Postal Code * (p)**
[            ]

Phone Number *
[            ]

Describe Yourself (Check all that apply) *
☐ Freelance Media      ☐ Media Pro
☐ Domain Expert        ☐ Industry Expert
☐ Student              ☐ Academic Pro
☐ Videographer         ☐ None of the above

[Save Profile]

TARGETING CONTENT CREATION REQUESTS TO CONTENT CONTRIBUTORS

BACKGROUND

The World Wide Web provides an arena for the exchange of vast amounts of information from an increasingly diverse set of individuals. From a PhD candidate's doctoral dissertation to a microblogger's update on their current wardrobe selection, different types of information can be found on the World Wide Web from people having a range of different backgrounds. Websites like youtube.com, associatedcontent.com, wikipedia.org, myspace.com, etc. allow users to submit content (e.g., text, images, videos) for public consumption. The number of individuals providing content to these sites and the number of individuals accessing this content show that people are not only willing to provide content for others to view, people are also willing and interested in consuming user-provided content.

In some cases, content distributors encourage content contributors to provide content by compensating the content contributors for their content and/or based on the popularity of their content (e.g., the number of times content consumers access their content). In turn, the content distributors can generate revenue by selling advertising space, where advertisements can be shown with the content when the content is accessed. Since advertising revenue is typically proportionate to the number of times that content is viewed or accessed, content distributors are rewarded when the contributed content is popular among content consumers. Often times, however, content contributors are unguided in their creation of content; each content contributor provides content that is of interest to him or her. Such unguided content may have limited appeal to other consumers, which means that the content is also of little value to a content distributor. Accordingly, the content distributor and the content contributor may not be reasonably compensated for the generation and publication of the content. If content contributors and content distributors could determine what kind of content consumers desired, they could increase their revenue by generating, or encouraging the generation of, the desired content. Furthermore, content is often provided by content contributors, who may not have any special background or expertise in the subject matter of the content they are providing. Content consumers would be more likely to consume content from content contributors who are well-suited and qualified to provide content of interest to consumers.

BRIEF DESCRIPTION OF THE DRAWINGS

FIG. 4 is a representative interface illustrating a contributor registration page of the assignment system.

FIGS. 5A and 5B are portions of a representative interface that a contributor may use to provide supplemental contributor information.

FIG. 9 is a representative interface through which an operator may select attributes of potential contributors to target.

FIG. 13 is a representative interface illustrating a template through which a contributor may submit an article.

DETAILED DESCRIPTION

Figure 1:
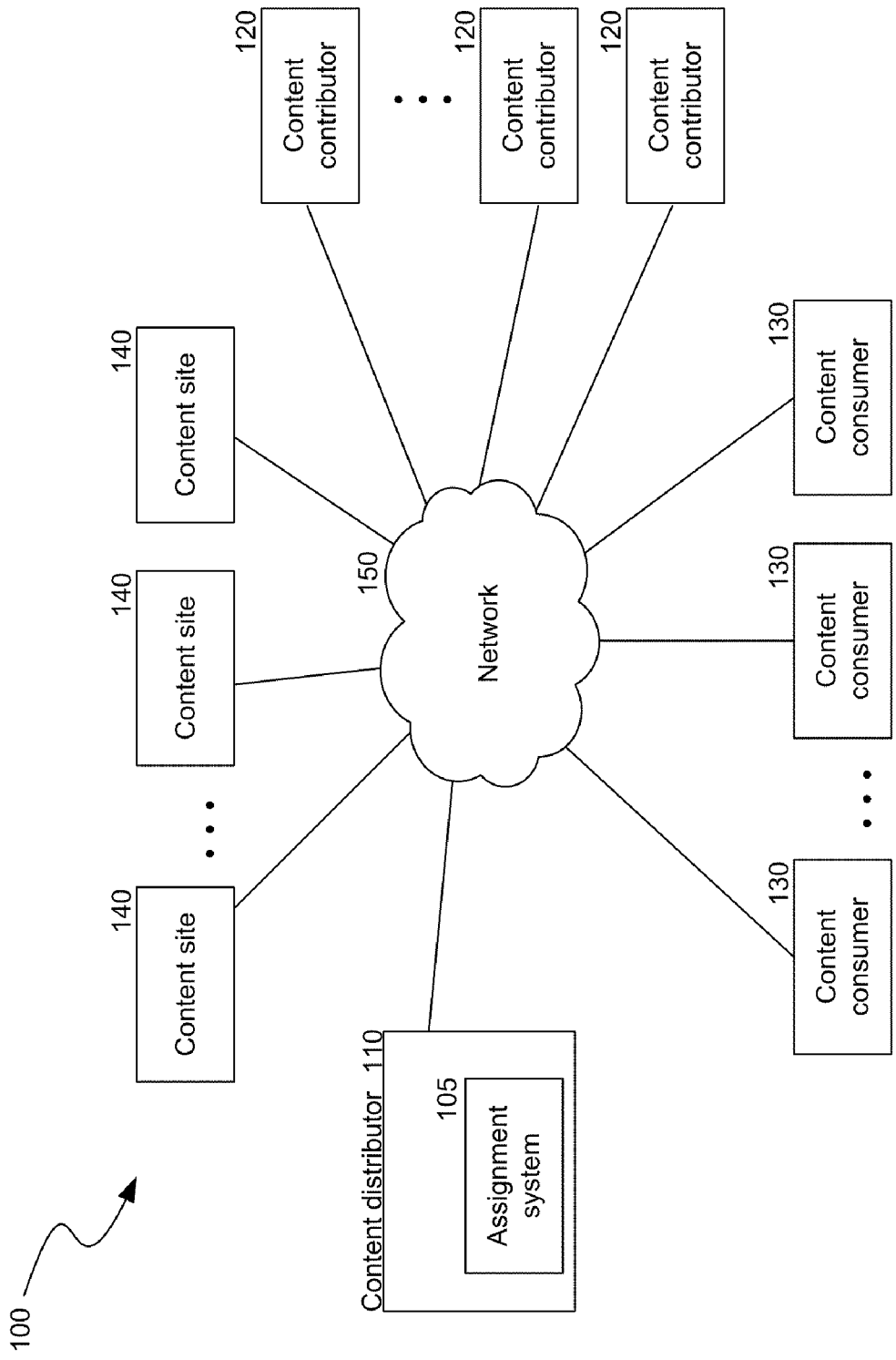
FIG. 1 is a block diagram of an environment in which an assignment system may operate.

An assignment system and method for generating content creation requests or "assignments" and targeting assignments to content contributors is disclosed. The assignment system is part of a content distribution system that aggregates, manages, and distributes/syndicates multimedia content that is generated by content contributors. As part of the acquisition of content, the assignment system may compensate the content contributors for the content that they provide to the system. The assignment system generates assignments that are likely to result in content that will be of interest to content consumers, such as visitors and/or subscribers to websites provided by, associated with, or using the content of the content distributor.

In some embodiments, the assignment system may generate assignments based on the popularity of pre-existing content or searches for content. For example, if content related to Sochi, Russia has recently become more popular or people are performing more searches related to Sochi, the assignment system may generate assignments for content related to that city, such as articles describing the history of Sochi, its current political climate, tourism information, etc. Additionally, or alternatively, the assignment system may generate an assignment for videos or images showing popular destinations within Sochi. By generating assignments for content that will likely be of interest to consumers, the assignment system can facilitate the generation of content that consumers are looking for, thereby increasing satisfaction among consumers. Furthermore, contributors will appreciate receiving an indication of assignments that will result in content likely to be popular among consumers, since increased popularity of the content will usually translate into more revenue to the contributor (e.g., if the contributor is compensated based on the number of times their content is viewed). Moreover, the content distributor will benefit from the assignment system because the distributor will receive new content intended to meet the demands of consumers, thereby driving consumers to the content distributor's site or to websites that use the content of the content distributor. The content distributor may see an increase in revenue if revenue is based on traffic associated with the content (e.g., by displaying advertisements against the content).

In some embodiments, the assignment system targets assignments to content contributors. The system identifies content contributors who are well-suited to generate content that will be successful among a target audience and notifies those contributors of available assignments. The contributors may be identified based on, for example, their expertise in a particular area, their past experience with providing content of a particular type (e.g., an article, audio, an image, a slideshow, a video) or on a specific topic (e.g., photography, boating, shopping, restaurants, taxes) or to a target audience (e.g., to women, to youth aged 15-19, to people of German ancestry), their geographic location (e.g., zip code, city, state, country), or the success (e.g., number of views, viewer ratings) of the contributor's previously provided content, etc. Using the previous example, the system may target assignments related to Sochi, Russia to contributors who are from Sochi, who currently live in Sochi, who wrote a master's thesis on the history of southeastern Russia, etc. As another example, the system may target assignments for content related to "taking better pictures" to contributors who have been identified as having some level of expertise or interest in photography or contributors who have provided highly-rated content on photography. By targeting assignments, the system ensures that those contributors that are likely to produce content that will be of value to potential consumers will receive the assignments, thereby increasing the likelihood that valuable content will be generated.

The assignment system may also manage the flow of content submissions that are responsive to an assignment. For example, an assignment may have various requirements or guidelines, such as quality (e.g., articles written at a tenth grade reading level, mp3 audio having a bitrate greater than or equal to 192 kbps), submitted content type and quantity (e.g. 50 articles or 100 videos or images), contributor credentials (e.g., average content rating exceeds 3.5 out of 5 stars, a PhD in a relevant subject, licensed member of an overseeing organization or associate), etc. For example, the system may generate an assignment for five hundred videos and require that the submitted videos meet the 720p standard and be from a contributor who has previously provided a minimum of 10 videos. As another example, the system may generate an assignment for a thousand videos of any quality, including videos taken from a mobile phone. The system allows contributors to checkout or "claim" an assignment, which notifies the system that the contributor intends to create content to fulfill the assignment. Each time a contributor claims an assignment, the system can determine whether the claiming contributor meets the requirements of the assignment and then adjust the availability of the assignment based on, for example, the quantity value associated with the assignment and the probability that the claiming contributor will submit content that meets the claimed assignment's requirements. The system may further verify that content submitted to fulfill an assignment meets the assignment's requirements.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

Various embodiments of the assignment system will now be described. The following description provides specific details for a thorough understanding and enabling description of these embodiments. One skilled in the art will understand, however, that the assignment system may be practiced without many of these details. Additionally, some well-known structures or functions may not be shown or described in detail, so as to avoid unnecessarily obscuring the relevant description of the various embodiments.

FIG. 1 is a block diagram of a representative environment 100 in which an assignment system 105 may operate. In the depicted example, a content distributor 110 is coupled to content contributors 120, content consumers 130, and content sites 140, via a computer network 150. The computer network 150 may be a public or private computer network 150, such as the Internet, a local area network, a wide area network, a point-to-point connection, a wireless network, and so on. The content distributor 110 collects, stores, and manages the presentation, distribution, and syndication of content. The content distributor 110 provides an interface, such as a website, through which content contributors 120 submit content and through which content consumers 130 access content. Content contributors 120 comprise authors, artists, film producers, illustrators, etc. who generate and/or provide content that may be hosted by content distributor 110. Content contributors 120 may have any level of experience, from an amateur with little to no content publishing experience or knowledge in any specific area or an expert with thirty years of experience in a particular field. Content consumers 130 represent individuals who are presented the provided content. Content consumers 130 may browse or search for various pieces of content through menus, navigation interfaces, etc. provided by the content distributor 110 or by content sites 140. Content sites 140 represent third-party sites, such as cnn.com or slashdot.org, that may be partnered with, or otherwise receive content from, the content distributor 110. Each content site 140 may rely on the content distributor 110 for some or all of the content that is presented on the site. For example, a content site may generate its own original content but it may also display content from the content distributor 110.

Content may be submitted by contributors 120 without prompting by the content distributor 110. That is, the content contributors 120 may submit pieces of content to the content distributor having a topic that is determined solely by the content contributors. Alternatively, a topic for submitted content may be suggested to content contributors 120 by the content distributor 110. To generate topics, the assignment system 105 resides at and may be operated under the control of the content distributor 110. As will be described in additional detail herein, the assignment system 105 may generate content assignments based on the popularity of pre-existing content or searches for content. Alternatively or additionally, third parties, such as content sites 140, may generate content requests and send the requests to the assignment system 105 of the content distributor 110. These third party requests are converted by the assignment system 105 to assignments that are distributed to prospective content contributors 120. As an example, a home improvement website may desire videos demonstrating various techniques for completing odd jobs around the home. The home improvement site may generate a third party request specifying certain requirements for content and quality and submit the third party requests to a content distributor for targeting by the assignment system 105. The assignment system of the content distributor can then target the third party requests to appropriate contributors for fulfillment.

The assignment system 105 and aspects of the content distributor 110 are implemented on one or more computing systems. A computing system may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the assignment system, which means a computer-readable medium that contains the instructions. In addition, the instructions, data structures, and message structures may be stored or transmitted via a data transmission medium, such as a signal on a communications link and may be encrypted. Various communications links may be used, such as the Internet, a local area network, a wide area network, a point-to-point dial-up connection, a cell phone network, and so on.

Embodiments of the assignment system 105 and associated environment may be implemented in and used with various operating environments that include personal computers, server computers, handheld or laptop devices, mobile devices, multiprocessor systems, microprocessor-based systems, network PCs, minicomputers, mainframe computers, computing environments that include any of the above systems or devices, and so on.

The assignment system 105 may be described in the general context of computer-executable instructions, such as program modules, executed by one or more computers or other devices. Generally, program modules include routines, programs, objects, modules, data structures, and so on that perform particular tasks or implement particular abstract data types. Typically, the functionality of the program modules may be combined or distributed as desired in various embodiments.

Figure 2:
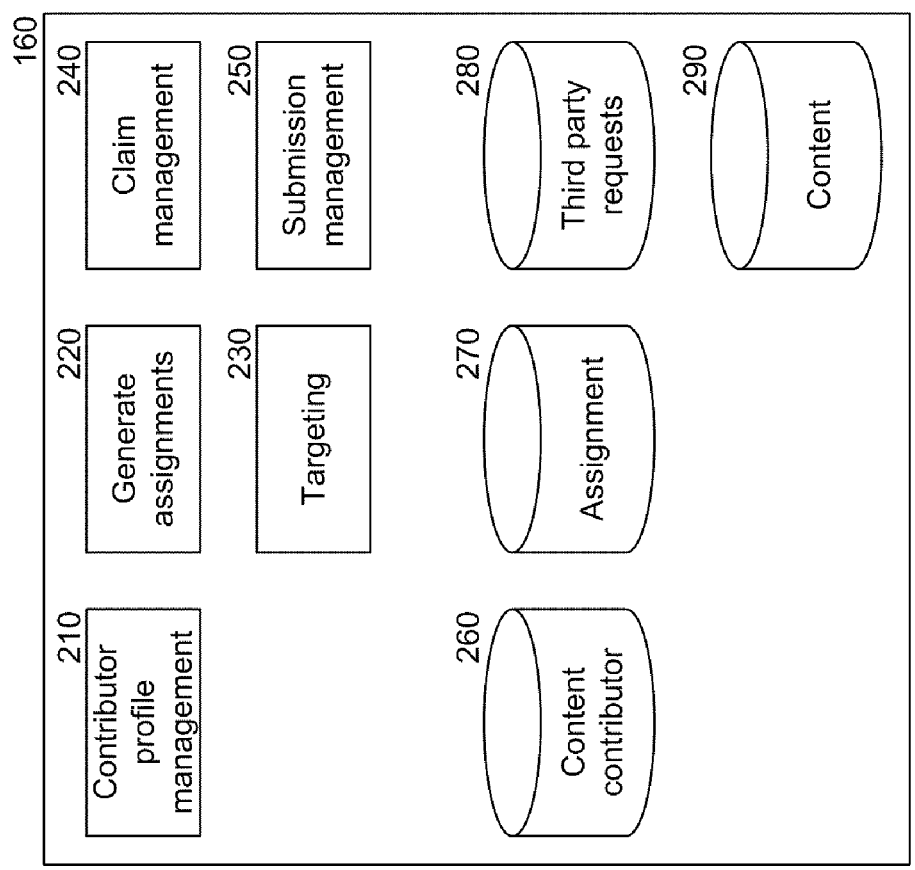
FIG. 2 is a block diagram illustrating modules of the assignment system.

FIG. 2 is a block diagram illustrating some of the modules that are contained in the assignment system 105. In the depicted example, the assignment system 105 includes a contributor profile management module 210, a generate assignments module 220, a targeting module 230, a claim management module 240, a submission management module 250, a content contributor store 260, an assignment store 270, a third party requests store 280, and a content store 290. All of the modules in the assignment system 105 will be described in additional detail herein.

The contributor profile management module 210, generate assignments module 220 and targeting module 230 identify desired topics of content and target assignment of those topics to content contributors that are well situated to provide responsive content. The contributor profile management module 210 generates a profile for a contributor based on, for example, information about the contributor collected from the contributor and/or other entities. Contributor profiles are used to target suitable assignments to that contributor. The generate assignments module 220 generates assignments intended to encourage contributors to generate content that is likely to meet current or upcoming demands of content consumers. For example, the assignment system may recognize an increase in the number of searches and views for content related to belly dancing and generate assignments related to that topic, such as "Where Can I Learn How to Belly Dance" or "Live Belly Dancing Reviews." Assignments are provided to content contributors in order to solicit submissions by the contributors of content that is currently of interest to consumers. Because the content consumers have an active interest in the topic, there is an increased likelihood that the consumers will view the generated content, which may increase revenue for both the contributor and the distributor. The targeting module 230 targets assignments to the contributors who are well-suited to produce content to meet each assignment's requirements. The targeting is performed by matching desired characteristics of a contributor that is suited to produce the content with the characterizations of contributors that are maintained in the contributor profiles. For example, the targeting module may target assignments related to "Classical Music" to contributors who have an interest in classical music or some level of expertise in that area. As another example, the targeting module may target assignments related to an annual Shakespeare festival to contributors who live in the area where the festival takes place.

Once assignments have been targeted to certain content contributors, the claim management module 240 and the submission management module 250 oversee the process by which contributors respond to the assignments. The claim management module 240 manages the claiming of an assignment to increase the likelihood that targeted assignments are (i) not claimed by too many contributors; and (ii) claimed by enough contributors to meet scope of effort requirements. The submission management module 250 manages the submission of content to ensure that submitted content and the content contributor satisfy an assignment's requirements.

Data utilized by the assignment system 105 is stored in various storage areas. A content contributor store 260 stores information related to content contributors, such as information a contributor provided during a registration process, information collected from other contributors about the contributor, information collected from external sources (e.g., the contributor's social networking page(s)), information received from third-parties, information generated by the assignment system based on tracking past performance and behavior of the contributor, and so on. An assignment store 270 stores information about generated assignments, such as their requirements, when they were created, when they expire, etc. A third party requests store 280 stores information about third party requests, such as the third party that submitted each request, various requirements, and so on. A content store 290 stores content collected from content contributors along with metadata associated with the content, such as data reflecting the performance of each piece of stored content. All data may be stored in any structured and accessible fashion using such applications or constructs as databases, tables, linked lists, arrays, and so on.

Figure 3:
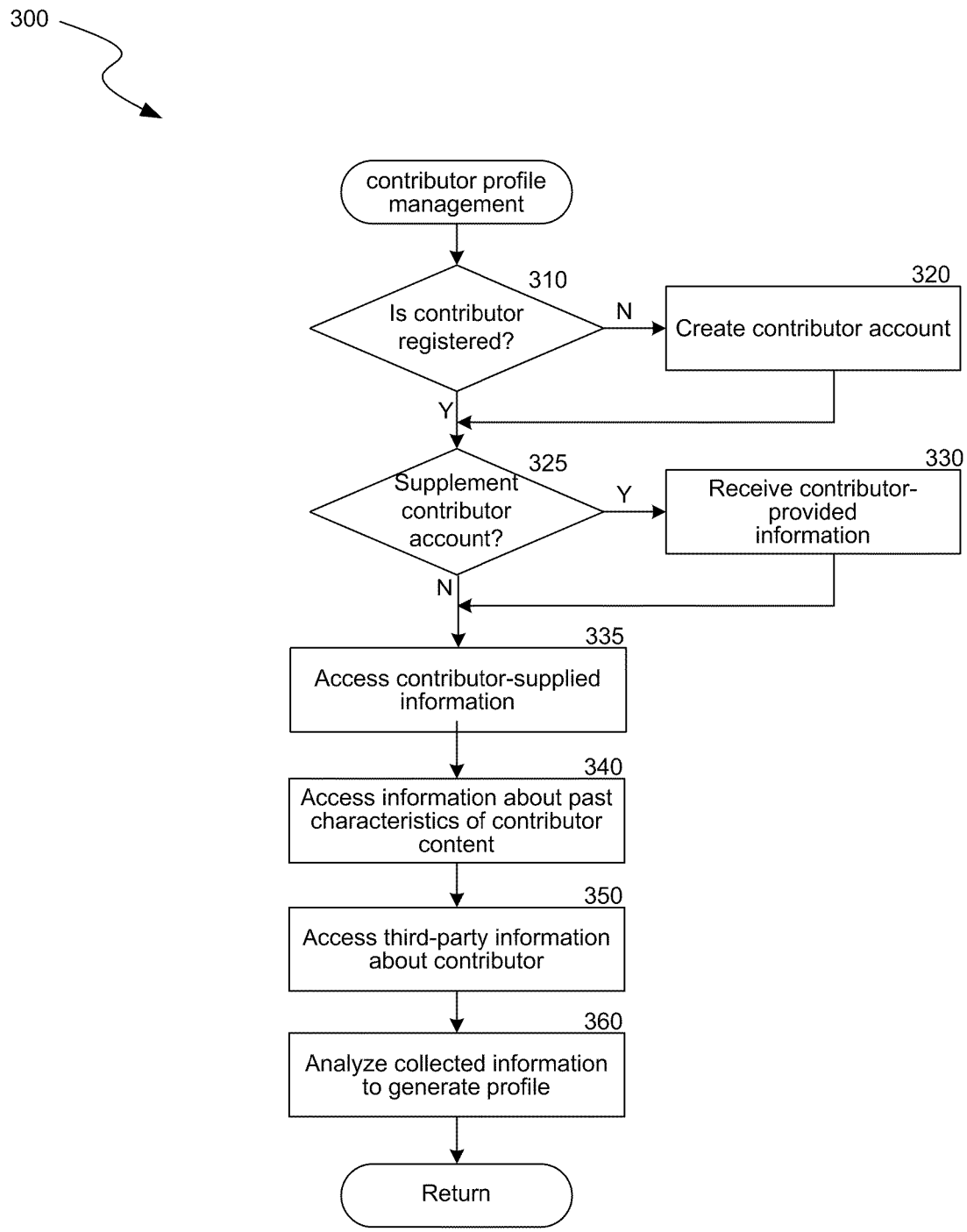
FIG. 3 is a flow diagram illustrating steps performed by a contributor profile management module of the assignment system.

FIG. 3 is a flow diagram illustrating a management process 300 performed by a contributor profile management module 210 of the assignment system 105. The assignment system may invoke the contributor profile management module 210 periodically to generate or update a profile that assists in the targeting of assignments to contributors. In some embodiments, the assignment system can invoke the contributor profile management module when the system receives information that may affect the contributor's profile, such as when the contributor posts new content or when someone comments on or rates the contributor's content. The assignment system uses contributor information to assist in the targeting of assignments. For example, the assignment system can target contributors residing in specific geographic areas for content related to activities within those areas. Similarly, the system may target contributors based on their email address. For example, the system may target contributors with email addresses from a particular domain, such as "uw.edu," for content related to the University of Washington.

Figure 4:
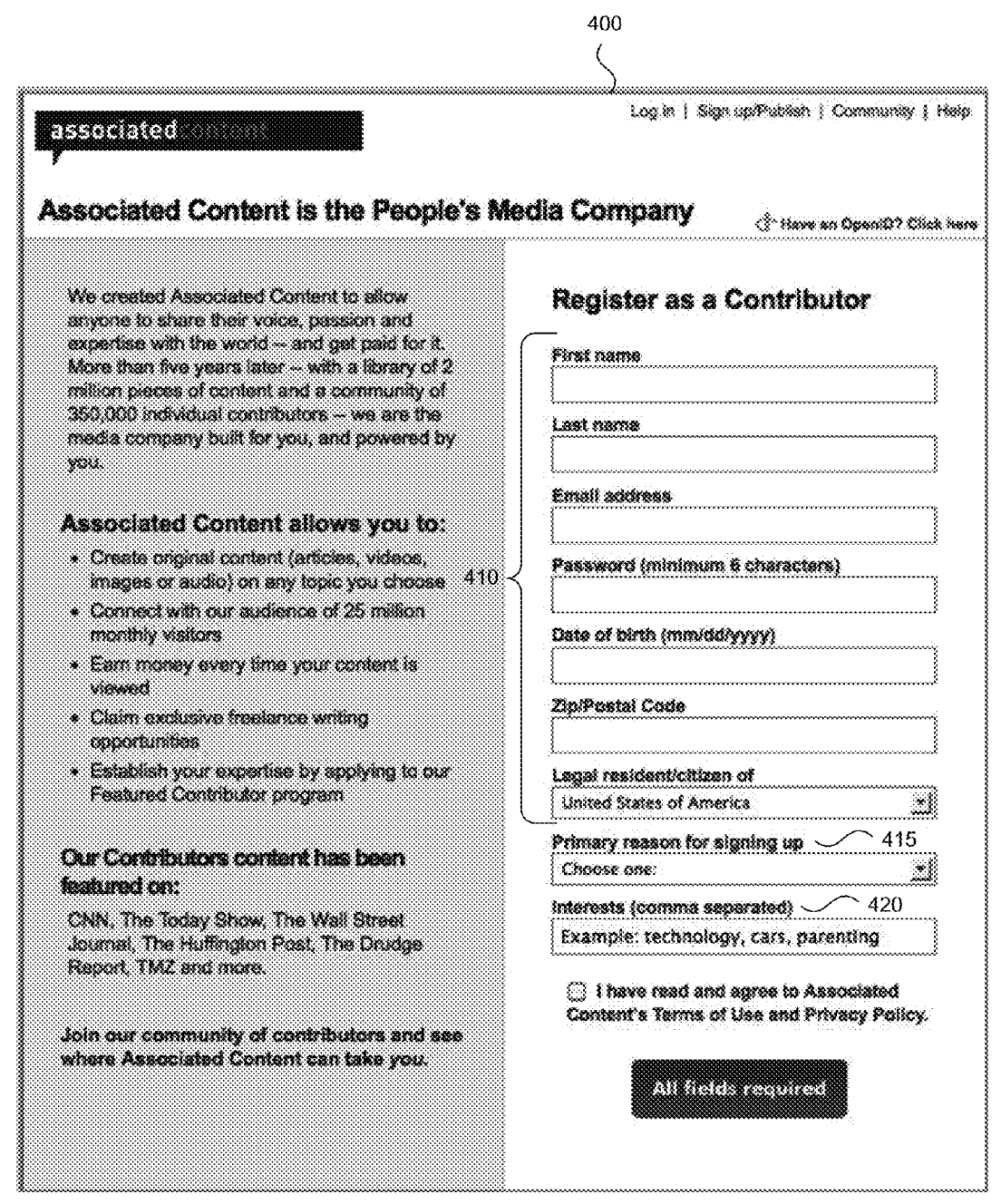

In decision block 310, the contributor profile management module 210 performs a check to see if the contributor has previously registered with the assignment system. If the contributor is not registered, processing continues at block 320 where the module creates an account for the contributor, else processing continues at block 330. Creating an account for a contributor may include collecting identification information about the contributor, such as a name and address, verifying the collected identification information, establishing a username and password for the contributor, etc. FIG. 4 is a representative interface illustrating a contributor registration page of the assignment system. Display page 400 may be displayed, for example, within a web browser. Registration information fields 410 include fields for receiving identification and contact information for the contributor, such as name, email address, password, date of birth, zip code, and residency. Registration information field 415 allows a contributor to select a "Primary reason for signing up," such as "To publish content," "To comment on content," "To contact a contributor," "To earn money," "To learn more," etc. The assignment system can use this information to weight contributor interests when targeting assignments. For example, contributors whose primary reasons for signing up are "To publish content" or "To earn money" may be more likely to claim assignments and produce higher quality content than those who join "To comment on content" or "To contact a contributor." Registration information field 420 allows a contributor to provide his or her areas of interest to the particular contributor. The assignment system may be more likely to target assignments related to a specific area or areas a contributor with an interest in those areas. As discussed previously, the assignment system may discount a contributor's interests to some degree based on the contributor's primary reason for signing up. One skilled in the art will understand that display page 400 is merely illustrative and that any type of form or means for collecting information about contributors may be used and that the system may collect any type of information about contributors and use this information to target assignments.

Figure 5A:
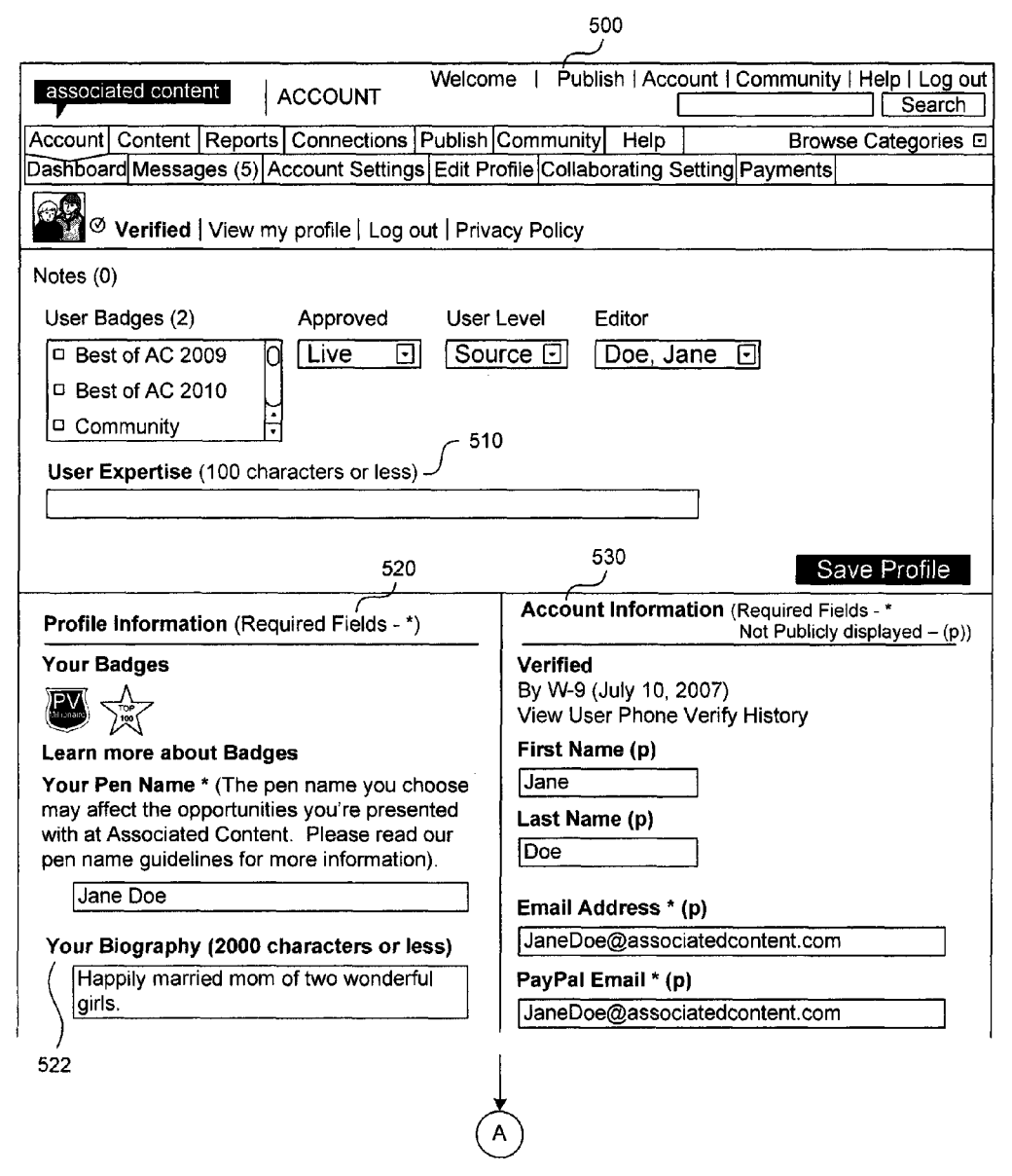

Returning to FIG. 3, in decision block 325 the contributor profile management module 210 determines whether the contributor would like to add supplemental information to their account. For example, the contributor may have updated his or her interests or email address since registering. As another example, the contributor may have provided a detailed biography or more information about his or her occupation, education, and/or affiliations, etc. after registering. If the contributor would like to update their account information, processing continues to block 330 where the contributor profile management module receives additional account information from the contributor. FIGS. 5A and 5B are portions of a representative interface that a contributor may use to edit their account information and provide supplemental contributor information. Display page 500 includes a User Expertise field 510 where a contributor can specify subjects in which they have some level of expertise. The assignment system may be more likely to target assignments related to a particular topic or category of topics to contributors who self-identify as experts in those areas. Profile information pane 520 includes fields where contributors can provide information about their interests and areas of knowledge, such as Biography field 522, Interests and Areas of Expertise field 524, Affiliations fields 526, and Experience/Education field 528. Information may be received from a contributor using free text, or the contributor may select areas of expertise, interests, education, etc. from menus which have a corresponding taxonomy of subjects. Account information pane 530 includes fields where contributors can provide other substantive information, such as name, location, and contact information.

After receiving information from the contributor, the contributor profile management module 210 uses the contributor-supplied information in conjunction with other information to construct a profile associated with the contributor. Returning to FIG. 3, in block 335 the contributor profile management module 210 accesses the contributor-supplied information that was received during the registration process or during an update process. As noted previously, the contributor-supplied information contains a variety of information that may reflect potential areas of expertise about the contributor.

In block 340 the contributor profile management module 210 accesses information about content that is associated with the contributor (for example, content that the contributor previously provided to the assignment system). The accessed information is maintained by the assignment system and may include, for example, the type of content provided, the content topic, the traffic generated by the contributor's content, ratings of the contributor's content, keywords identified within the content, etc. As an example, the assignment system may analyze comments or feedback provided by viewers of the content and/or content administrators. The comments or feedback may allow the assignment system to draw conclusions about the strengths or weaknesses of the contributor, such as that the contributor provides high quality nature photographs but low quality photographs of people or that the contributor has been "red flagged" as often providing content that may be inappropriate for certain audiences.

In block 350, the contributor profile management module 210 accesses information about the contributor from third-parties. Information accessed from third parties may be collected by the contributor profile management module. For example, the module may collect information from websites or social networking sites with which the contributor has an account, such as linkedin.com, myspace.com, twitter.com, GOGGLE LATITUDE, etc. The assignment system may access these accounts, or the accessible information associated with these accounts, to determine additional information about the contributor, such as additional areas of interest, their current or recent activities, their current location, etc. For example, a contributor may indicate that he or she is planning a backpacking trip through Patagonia. The assignment system may use this information to target assignments for images of that region to the contributor. Conversely, if the assignment system determines that the contributor is currently in Sydney, Australia, the assignment system may avoid targeting an assignment for footage of a surfing contest in Hawaii to that contributor. The contributor profile management module may also receive information from third-parties about the contributor. For example, the module may receive information from organizations, such as a membership list, that would allow the module to associate the contributor with the organization. The module may use this information to discern additional information about the contributor, such as his or her interest, background, or qualifications. For example, if the contributor is a member of the American Dental Association, the assignment system may judge the contributor to be more reliable for providing content related to dentistry.

Once the contributor profile management module 210 has collected pertinent information about a contributor in blocks 335-350, in block 360 the module analyzes the collected information to generate a profile for the contributor. For example, the module may analyze the collected information by generating one or more keywords or phrases that are associated with the contributor, and storing the keywords in the contributor's profile. Keywords may highlight particular strengths of the contributor, and may therefore be correlated with descriptions of assignment that the contributor would do a good job of fulfilling. Keywords may also highlight particular weaknesses of the contributor, and may be used to steer certain assignment away from the contributor. The contributor profile management module 210 analyzes the collected information to determine a contributor's predicted ability in a given area. For example, the system may determine that a contributor with a Master's Degree in Economics and who works as an economist will likely provide high quality economics related content. As another example, if a user has provided several articles on fly-fishing and many of them have received high ratings from content consumers, the system may determine that the user will likely provide high quality fly-fishing related content in the future and can target assignments accordingly. After generating a profile for the contributor, the management process 300 returns. It will be appreciated that the management process 300 may be performed on a periodic basis (e.g., weekly, monthly, yearly) to update a contributor's profile, or may be performed upon the occurrence of a particular event (e.g., a contributor updates their account information, a third party provides information about a contributor).

Figure 6A:
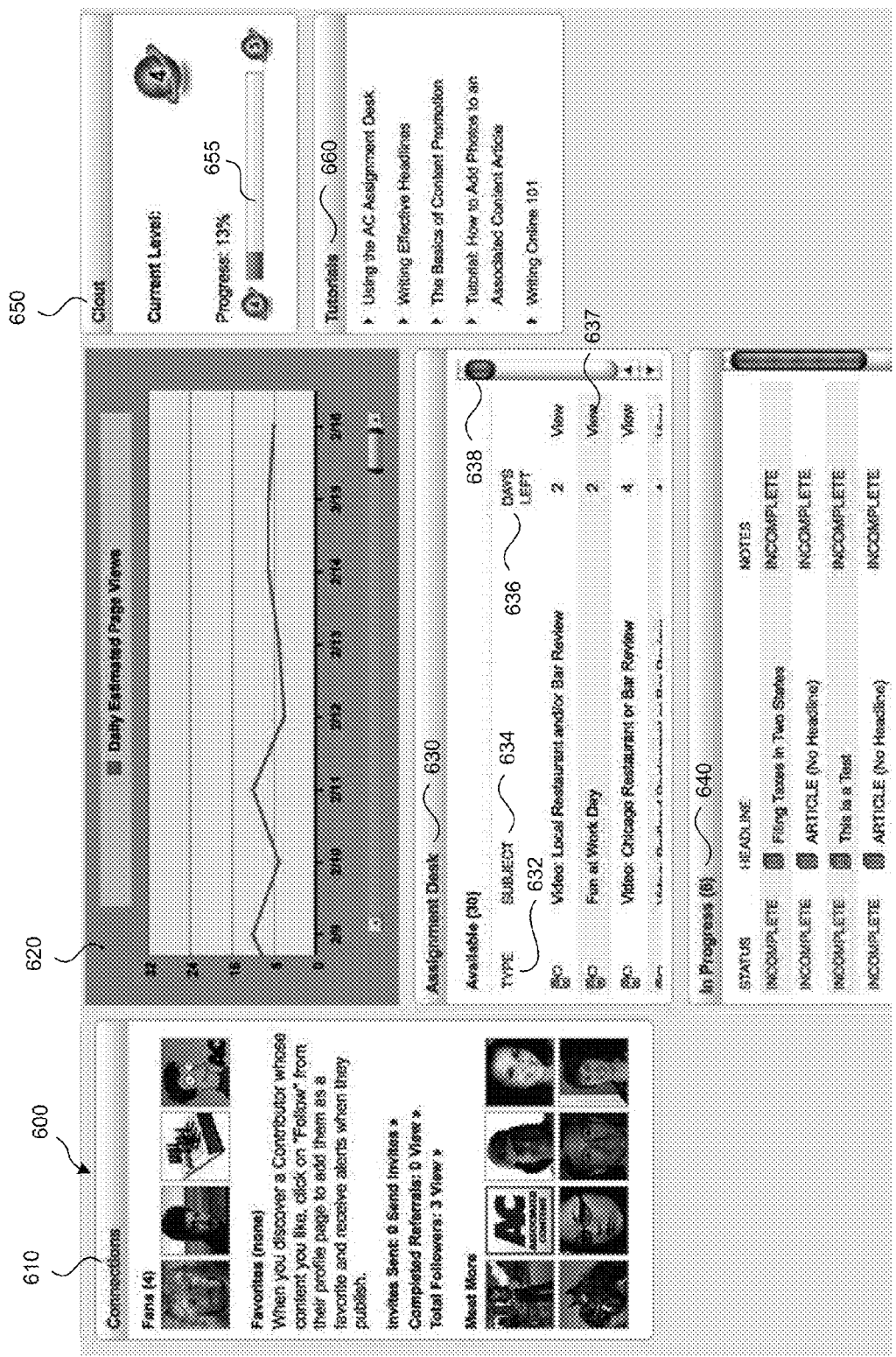
FIG. 6A is a representative interface illustrating a contributor account page of the assignment system.

FIG. 6A is a representative interface illustrating a contributor account page 600 of the assignment system 105. The contributor account page includes a number of widgets that allow the contributor to accept assignments, monitor submitted assignments, and otherwise manage their relationship with the assignment system. The contributor account page 600 includes a "Connections" pane 610 which provides an indication of the contributor's fans, or content consumers and/or other content contributors who have indicated an interest in viewing the contributor's content. A "View" pane 620 provides an indication of the number of views the contributor's content has received over a predetermined period of time. In this example, view pane 620 shows the number of views for each day over the course of eight days for the contributor's entire body of content. In some embodiments, the view pane provides an indication of views over a period other than a week and in different increments, such as the number of views during each month over the course of a year, or the number of views during each hour over the course of a day, etc. A "Clout" pane 650 provides an indication of the contributor's clout within the assignment system. Clout is generally based on the number of pieces of content that the contributor has provided and the total number of page views for the contributor's content in the aggregate. As a contributor's clout increases, the contributor may receive more money per page view. For example, a contributor with a clout level of 1 may receive one rate per thousand page views (ppm) while a contributor with a clout level of 10 receives a second rate. A "Tutorials" pane 660 provides a list of available tutorials that the contributor can access to assist in their creation of content.

Two widgets are provided on the contributor account page 600 to allow the contributor to accept assignments and track progress on assignments. An assignment desk 630 provides a list of available assignments that have been targeted to the contributor. Within the assignment desk 630, a "type" column 632 indicates the requested content type(s), such as an article, image, or video, associated with each assignment. An icon is displayed in the type column to allow the contributor to quickly see the type of content that has been requested. A "subject" column 634 indicates the subject, or the topic, of the assignment. A "days left" column 636 indicates the number of days remaining before the assignment expires. Each row in the assignment desk represents a different assignment that the contributor can accept. The assignments may be presented to the contributor in an ordered fashion, such that the assignments most likely to be selected by the contributor are listed first in the assignment desk, and the assignments least likely to be selected by the contributor are listed last in the assignment desk. As will be described in greater detail herein, the order in the list may be determined by the targeting method that associates assignments to contributors. The contributor may scroll through the available assignments in the assignment desk using a scroll bar control 638. The contributor may also sort the list by selecting any of the column headings. To see additional details of an assignment, the contributor clicks or otherwise selects a "view" button 637 that is associated with each assignment. When the contributor selects the view button, a pop-up window or other screen is opened that displays the details of the assignment to the contributor.

Figure 6B:
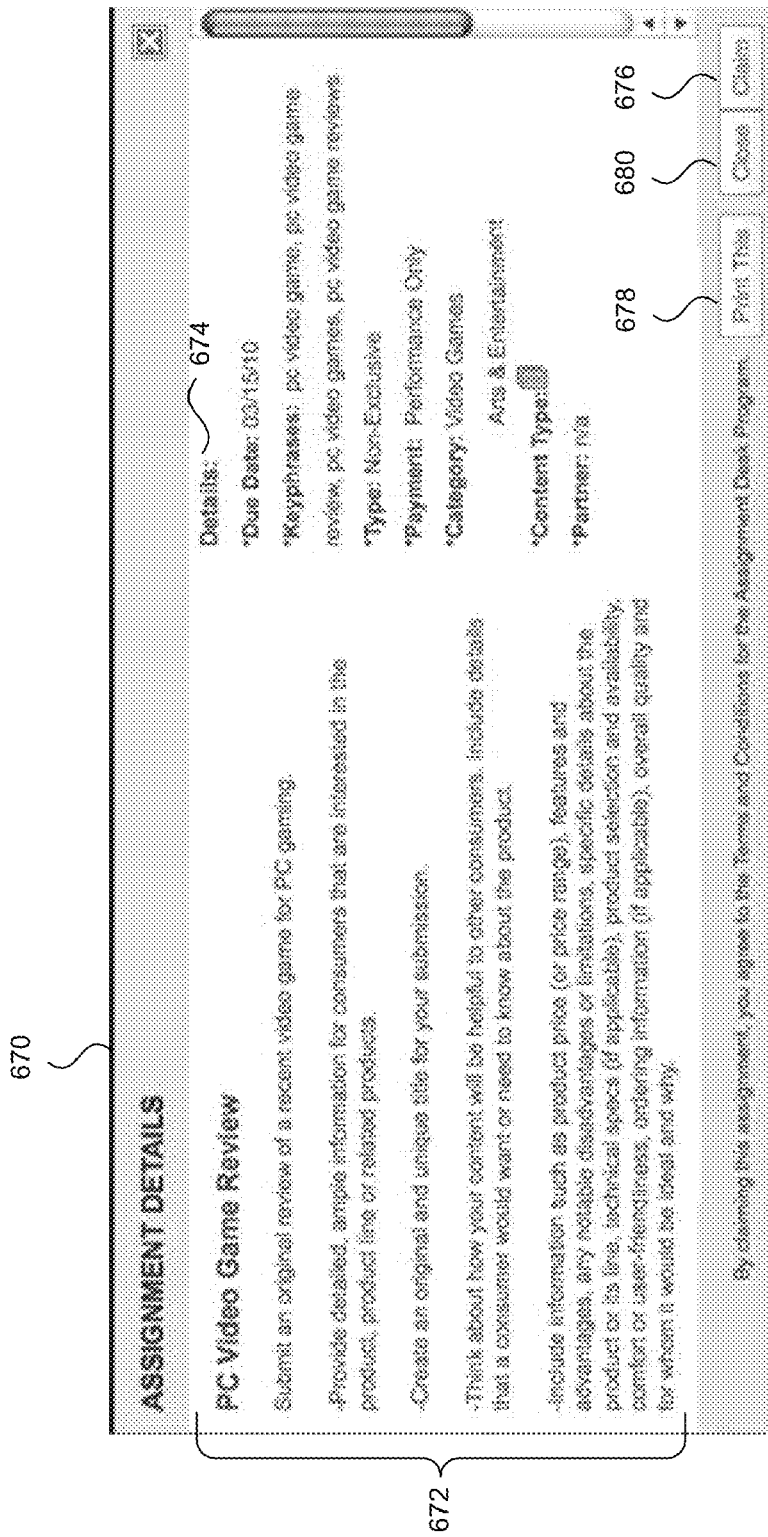
FIG. 6B is a representative interface that depicts a representative assignment in a pop-up window.

FIG. 6B is a representative interface 670 that is generated by the assignment system 105 of a viewed assignment. The interface provides a description 672 of the assignment, such as a general description of the scope of the assignment and tips for providing content that is likely to be valuable given the scope of the assignment. The interface also includes details 674 of the assignment, such as a due date for providing content, keyphrases associated with the assignment, the type of assignment (i.e., the terms under which the content will be licensed or transferred to the operator of the assignment system), how the contributor will be paid (e.g., for providing content, for "hits" or the number of times the content is view, or both), a category for the assignment, the type of content requested (e.g., text, video, audio), whether or not the assignment was generated by the assignment system or a third party, or "partner," such as a content site, etc. Through the interface, a contributor may then elect to claim the assignment by clicking the "Claim" button 676, print the assignment by clicking the "Print This" button 678, or continue browsing other assignments by clicking the "Close" button 680.

Returning to FIG. 6A, an "In Progress" pane 640 provides a list of assignments that the contributor has claimed and the current status of those assignments (e.g., incomplete, complete, approaching expiration). When the contributor submits content that is responsive to an assignment, the assignment system will track the content through an approval process and notify the contributor when the content has been accepted or rejected. In some embodiments, the "In Progress" pane 640 will provide a control that allows a contributor to return an accepted assignment to the pool of available assignments.

Figure 7:
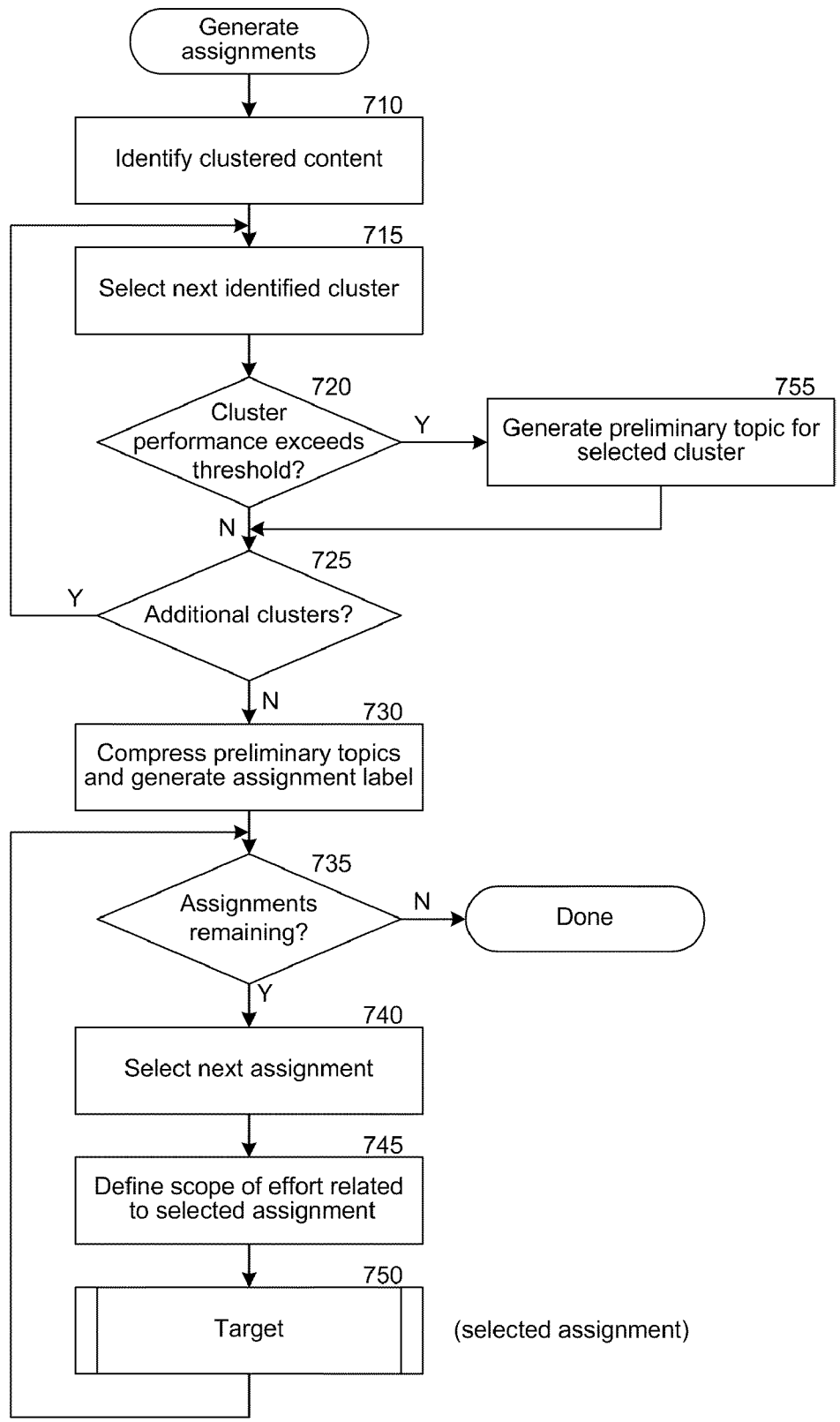
FIG. 7 is a flow chart illustrating steps performed by a generate assignments module of the assignment system.

FIG. 7 is a flow chart illustrating steps performed by the generate assignments module 220 of the assignment system 105. The module is invoked to generate assignments for content that consumers desire or are looking for. The generated assignments can then be targeted to contributors for content creation. In the depicted example, the module generates assignments by identifying groups of pre-existing content that are performing well, and then generating assignments that are the same as or similar to the pre-existing content in order to provide additional materials related to the content that content consumers are currently demanding (e.g., content related to current events, seasonal topics, etc.). In block 710, the module identifies one or more clusters of content that are currently being managed by the content distributor 110. A cluster of content is two or more pieces of content sharing a similar topic or subject matter. The content may have been clustered automatically based on an analysis of keywords in the content or metadata associated with the content. In some examples, the assignment system may outsource content clustering to a facility capable of analyzing the content and semantically grouping the content according to the analysis, such as REUTERS' OPENCALAIS. Alternatively, content may be grouped manually by, for example, content administrators or outsourced to a crowdsourcing marketplace, such as AMAZON'S MECHANICAL TURK.

Once one or more clusters have been identified, the performance of each cluster is monitored by the assignment system 105. In block 715, the module selects the next identified cluster. In decision block 720, the module determines whether the performance of the selected cluster exceeds a performance threshold, such as a predetermined number of views, an increase in the number of views, an increase in the number of searches performed with results that include the clustered content, a threshold level of revenue (e.g., advertising revenue) associated with the cluster, etc. In some embodiments, if a piece of content within a cluster has been cited or published on a particular website or outlet, such as CNN.COM or THE WALL STREET JOURNAL, the assignment system may accelerate the cluster for assignment generation. If the cluster exceeds the performance threshold, then the module continues at block 755, else the module continues at decision block 725. In block 755, the module generates a preliminary topic for the selected cluster and then continues at decision block 725. The preliminary topic is generated by identifying one or more keywords that are shared by each piece of content in the cluster, and then ranking the shared keywords based on their frequency of use and relative uniqueness. Shared keywords that exceed a certain frequency and uniqueness are aggregated to generate the preliminary topic associated with that cluster. The generated keywords provide a raw description of the cluster, such as "snowboarding tricks Shaun White" or "orchid care." In decision block 725, if there are additional clusters to select, the module loops back to block 715 to select the next cluster and generate a preliminary topic for the selected cluster if the performance threshold is met. Otherwise, the module continues at block 730.

In block 730, the generate assignments module 220 "compresses" one or more like preliminary topics in order to generate final topics that are suitable for an assignment. For example, similar preliminary topics, such as "orchid care," "caring for orchids," and "when to water orchids" and their associated clusters may be "compressed" or grouped together or combined before generation of an assignment. Compression may or may not be required, depending on the number of preliminary topics and the similarity between the preliminary topics. The assignment system then generates labels for the final topics that represent an assignment and provide a contributor a brief description of the topic that is being requested for that assignment. For example, using the preliminary topics from above, the assignment system may generate assignment labels of "What are Shaun White's Signature Snowboarding Tricks?" or "Tips for Caring of an Orchid." The system may generate assignment labels automatically or generation process may be performed manually by, for example, an administrator or a crowdsourcing marketplace.

Once final topics for assignments have been selected and labels assigned to the assignments, the generate assignments module 220 defines a scope of effort that is associated with each assignment. In decision block 735, the module determines whether any assignments remain to be processed. If all assignments have been assigned a scope of effort, then processing halts. Alternatively, in block 740 the module selects the next assignment for processing. In block 745, the module defines a scope of effort related to the selected assignment, such as the type of content required, the quality of content required, the number of pieces of content that should be created for the assignment, a time limit for creating the content after claiming an assignment, an expiration date for the assignment, any requirement on contributors to claim the assignment (i.e., any minimum qualifications that a contributor must have to claim an assignment), a target audience, etc. The information defining the scope of effort may be based on the body of content contained in the cluster from which the assignment was originally derived. In some cases, the scope of effort that is defined for an assignment is consistent with the make-up in the original cluster. For example, if 30% of the content within the original cluster consists of articles directed to a general audience and 70% of the content consists of videos or articles directed to an audience of doctors, the assignment may specify a scope of effort consistent with these percentages (i.e., the scope of effort may keep the same 30%/70% split as was in the original cluster). In some cases, the scope of effort that is defined for an assignment is the inverse of the make-up of the original cluster, thereby attempting to remedy some of the gaps in the original cluster. For example, if 80% of the content in the original cluster was text and 20% of the content in the original cluster was video, the scope of work for the new assignment may request that 20% of the new content be text and 80% of the new content be video. In some cases, the module may generate multiple assignments for the diverse content, such as one assignment requesting text content and one assignment requesting video content. In block 750, the module invokes a targeting module to target each assignment to one or more contributors that are suited to fulfill the assignment. Further details about the targeting module will be described in additional detail herein. Following the targeting of an assignment, processing returns to block 735 to determine whether any assignments remain to be processed.

In some embodiments, the generate assignments module 220 may generate assignments by identifying gaps within the content stored by the content distributor. The module may generate a taxonomy of content corresponding to categories and sub-categories associated with the stored content. By determining which categories or sub-categories have fewer pieces of associated content, the module can identify gaps in the content. For example, a taxonomy corresponding to restaurants in New York City may identify nineteen Thai restaurants in the Village. By analyzing the content associated with each of these restaurants, the module can determine whether there is an existing gap in the content. If, for example, there are an average of 5.4 pieces of content for each restaurant, the module may generate assignments for content related to the restaurants for which there are fewer than 5.4 pieces of content.

In some embodiments, rather than automatically generating assignments based on clusters and/or categories, the generate assignments module may receive manually-generated assignment requests. For example, an operator of the assignment system or a third party, such as an operator of a content site, may specify a plurality of keywords or phrases corresponding to desired content, such as "economy hotels" and "Tokyo" and a specification of requirements for the desired content, such as a deadline for providing the content, a content type, and a content quantity. Based on the characteristics of the manually-generated assignment requests, the generate assignments module can generate assignments and target the assignments to potential contributors. In this manner, an individual can manually create assignments for specific content and the assignment system 105 can automatically target the manually-generated assignments appropriately.

Figure 8:
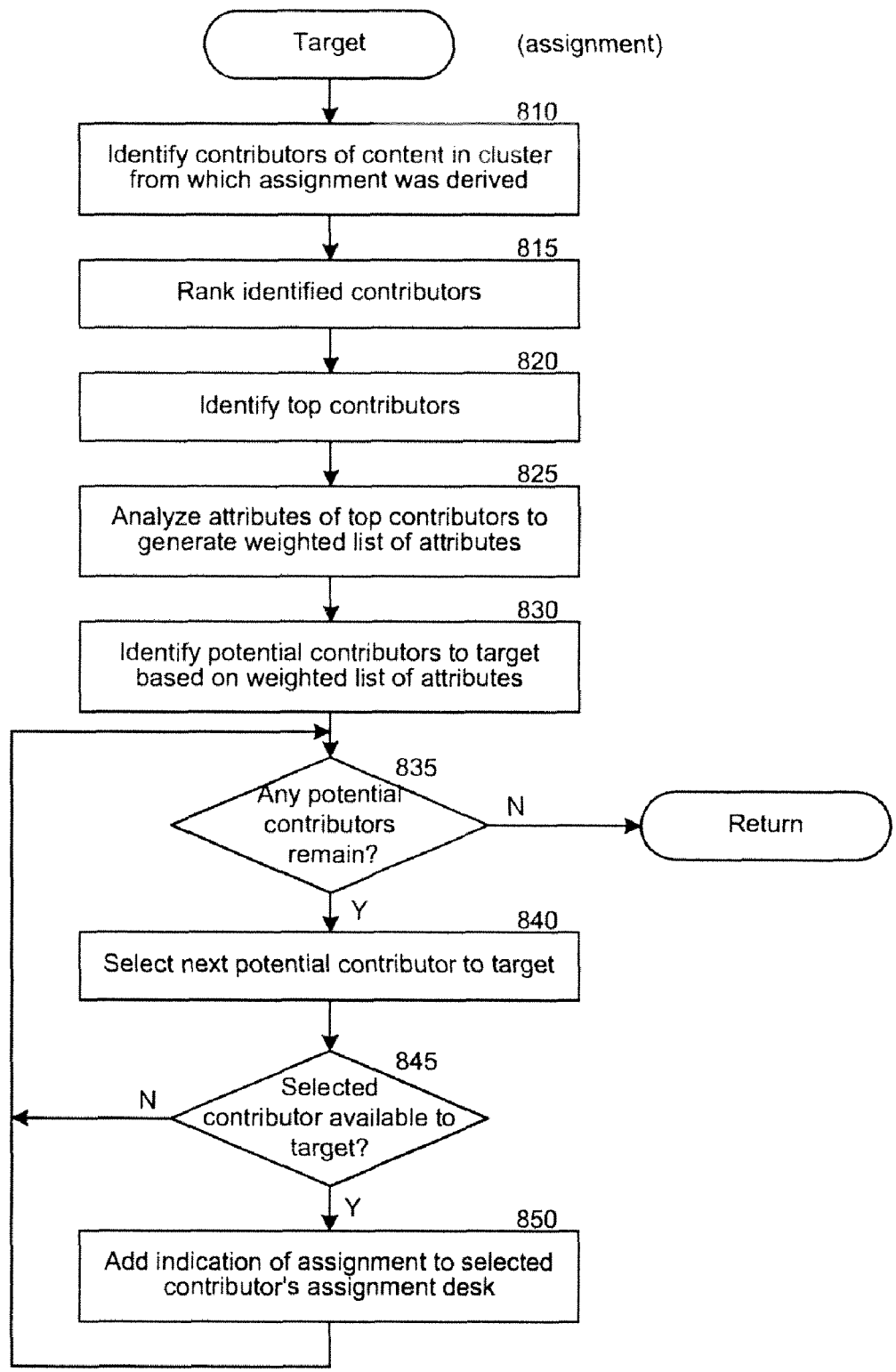
FIG. 8 is a flow diagram illustrating steps performed by a targeting module of the assignment system.

FIG. 8 is a flow diagram illustrating steps performed by a targeting module 230 of the assignment system 105. The module is invoked to identify contributors to target for each assignment. In block 810, the module identifies contributors of content (e.g., authors of articles or producers of video) in the original cluster from which an assignment was derived. In block 815, the module ranks the identified contributors based on the performance of their content within the cluster. For example, the system may rank contributors based on the total number of views of their content in the aggregate or on average. As another example, the module may rank contributors according to the percentage increase in views of their content over a predetermined period. As yet another example, the module may rank contributors according to the amount of revenue that is associated with their content. In block 820, the module identifies the top contributors. For example, the module may identify the top 15 contributors, the top 5 percent, the top quartile, etc. In block 825, the module analyzes the attributes of the identified top contributors to generate a weighted list of attributes or attribute values. For example, the module may identify attributes, such as location, interests, or areas of expertise that are common to all or many of the top contributors and assign a relatively high weight to these attributes while assigning a relatively low weight to the attributes that do not correlate to the top contributors. As another example, the module may perform a statistical analysis of the attributes of the top contributors to generate a statistical model, such as a linear regression model.

In block 830, the targeting module 230 identifies potential contributors to target based on the weighted list of attributes by comparing the weighted list of attributes with the database of all contributors to identify potential contributors with similar attributes. In this manner, the module uses the attributes of those identified as historically providing the "best" content to target similarly-situated contributors for new content. For example, contributors that share many of the heavily-weighted attribute values with the top-ranked contributors may be selected as potential contributors to target while contributors that do not share any attribute values with the top-ranked contributors are not selected as potential contributors to target. As another example, the module may use a statistical model generated from the top contributors to score each of the potential contributors to target based on their attribute values. In some embodiments the module may identify a fixed number of potential contributors to target. In other embodiments, the module may only identify those potential contributors to target that exceed some predetermined threshold of similarity with the top contributors.

Figure 9:
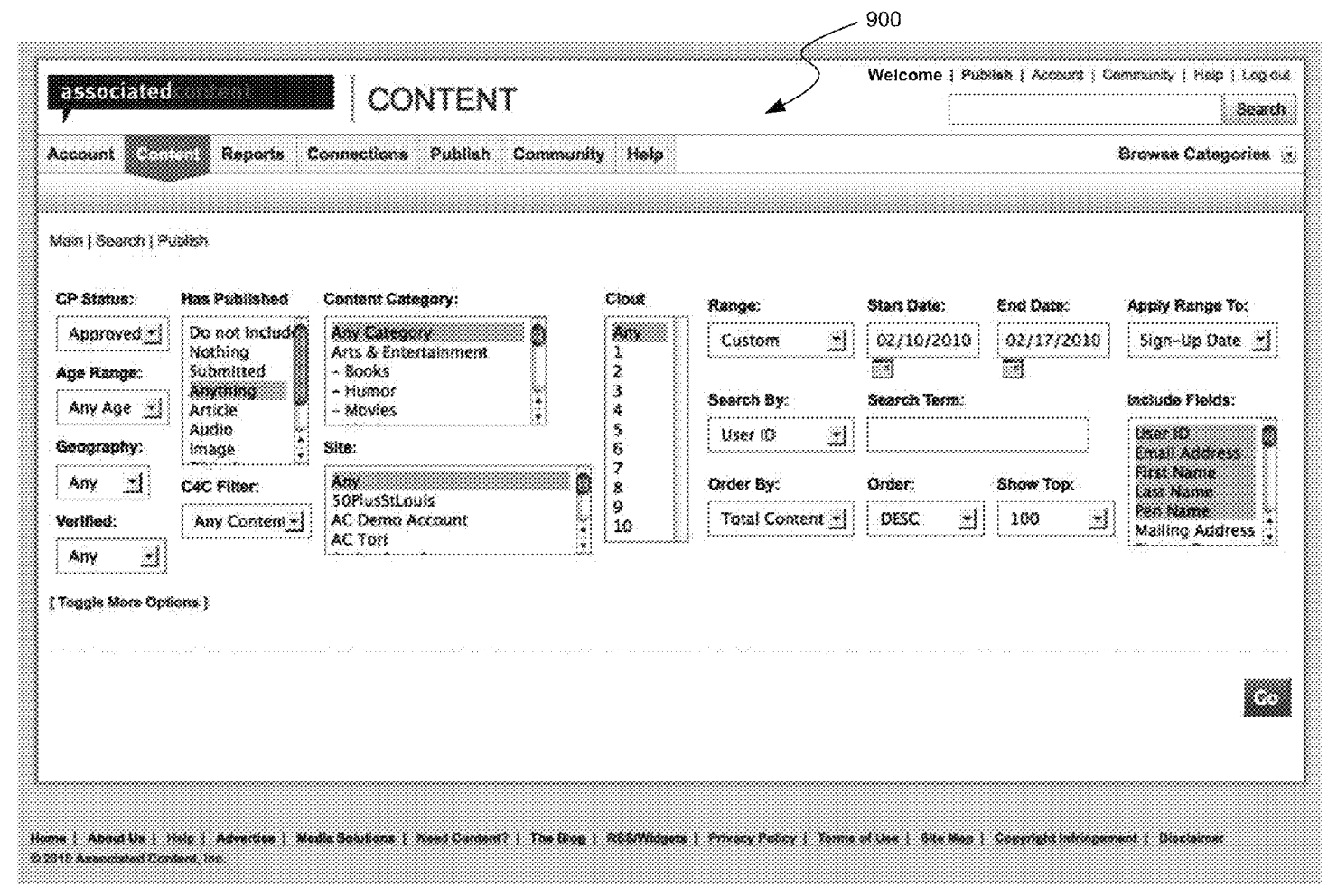

Rather than target the assignments in a completely automated fashion, in some embodiments the targeting of some or all of the assignments may be performed manually. FIG. 9 is an example of a user interface 900 through which an operator may manually select attributes of potential contributors to target. For example, an operator or administrator generating a third party request for a content site may specify options in the interface to identify contributors between the ages of 25 and 35 within the southwestern United States who have published at least one article and one video and who have a clout level greater than or equal to 7.

Returning to FIG. 8, in block 835 the targeting module 230 determines whether any potential contributors remain to be targeted. If all of the potential contributors have been selected, processing is halted. If potential contributors remain to be targeted, processing continues to a block 840 wherein the module selects the next potential contributor to target. In decision block 845, if the selected contributor is not available to target because, for example, a maximum number of assignments have already been targeted to the selected contributor, the contributor does not meet certain requirements of the assignment, or the contributor has a history of claiming targeted assignments and never providing suitable content for the assignment, then the module loops back to block 835 to select the next potential contributor to target. If the contributor is available to target, processing continues at block 850. In block 850, the module adds an indication of the assignment to the selected contributor's assignment desk. The module may add indications of assignments to the contributor's assignment desk in a particular order, such as by placing assignments most likely to be selected by the contributor closer to the top of the list of assignments in the assignment desk and those assignments least likely to be selected by the contributor closer to the bottom of the list. As another example, the order in the list may be determined by the targeting method that associates assignments to contributors. If, for example, an assignment was targeted to a contributor using an automated targeting method, the system may place the assignment closer to the top of the list than assignments targeted using a manual targeting method. As another example, the indication of an assignment may placed into the list based on how well the associated contributor matched the weighted list of attributes, with closer matches being listed higher. By adding an indication of the assignment to the assignment desk, a contributor is able to select the assignment and fulfill the request for content. After adding the assignment to the selected contributor's assignment desk, processing loops back to block 835 to select the next potential contributor to target.

Figure 10:
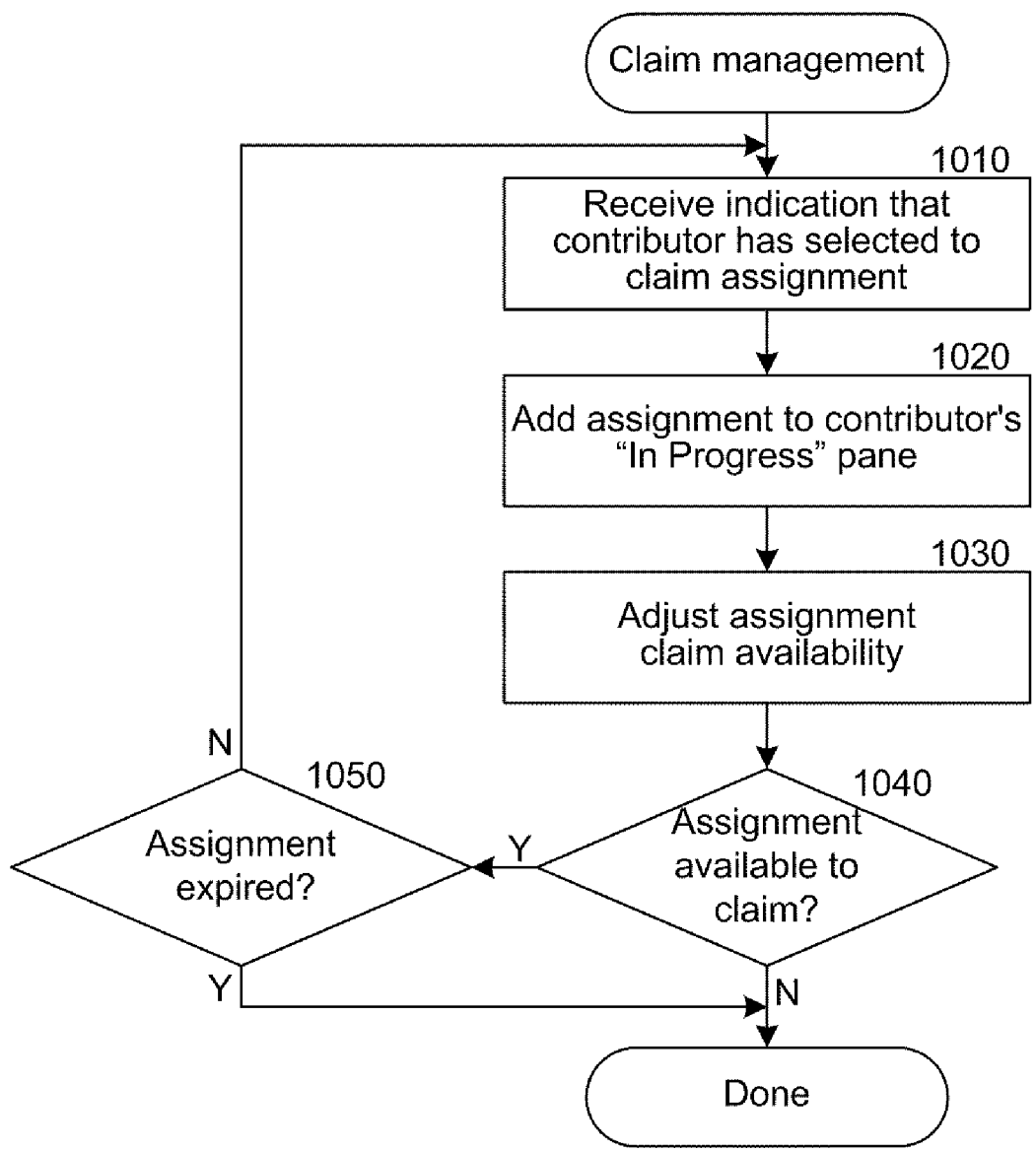
FIG. 10 is a flow diagram illustrating steps performed by a claim management module of the assignment system.

FIG. 10 is a flow diagram illustrating the steps of a claim management module 240 of the assignment system. The claim management module is invoked for each generated assignment and manages claims to assignments that are received from contributors and the availability of the assignment to be claimed. In block 1010, the module receives an indication that a contributor has claimed an assignment. In block 1020, the module adds the assignment to the contributor's "In Progress" pane. In block 1030, the module adjusts the assignment's availability to be claimed, or "claim availability." Claim availability is based on the assignment's scope of effort, the return rate for the requested content (i.e., the rate at which claimed assignments are returned without satisfactory content), the contributor's fill rate (i.e., the rate at which the contributor provides satisfactory content for claimed assignments), and the number of pieces of content that have been submitted for the assignment. The assignment's scope of effort establishes a baseline for the permissible number of outstanding claims. For example, the scope of effort may indicate that 750 articles are being requested, which can serve as a baseline for the permissible number of outstanding claims for the assignment. If the type of content requested for the assignment has a relatively low return rate, the assignment system 105 may increase the permissible number of outstanding claims. For example, if 75% of claimed assignments for articles are returned with satisfactory content, the assignment system may increase the permissible number of outstanding claims (e.g., from 750 to 1000) to increase the likelihood that the scope of effort is satisfied (i.e., that 750 pieces of content will be submitted). Conversely, if a content type has a return rate of 1% or if the assignment requires that a contributor have a low return rate in order to claim the assignment, the module may not adjust the permissible number of outstanding claims for an assignment beyond that which is already specified in the scope of effort.

When a contributor claims an assignment, the claim management module 240 adjusts a count corresponding to the number of times that the assignment has been claimed. For example, the module may increase the count by 1. Alternatively, the module may increase the count based on the claiming contributor's overall return rate or return rate for the content type(s) associated with the assignment. For example, if the claiming contributor has a return rate of 35%, the module may increase the count by 0.65 (or 1.0-0.35), to account for the probability that the contributor may return the assignment with unsatisfactory content or may fail to return the assignment at all. In this manner, although the count may exceed the permissible number of outstanding claims, the assignment system is more likely to receive enough content to satisfy the assignment's scope of effort. The assignment system may accept more content than the number specified by an assignment's scope of content or may reject any submissions beyond the total specified.

In decision block 1040, if the assignment remains available to claim, then the claim management module 240 continues at decision block 1050, else the module completes. In decision block 1050, if the assignment has expired, then the module completes, else the module loops back to block 1010 to wait for additional contributors to claim the assignment.

Figure 11:
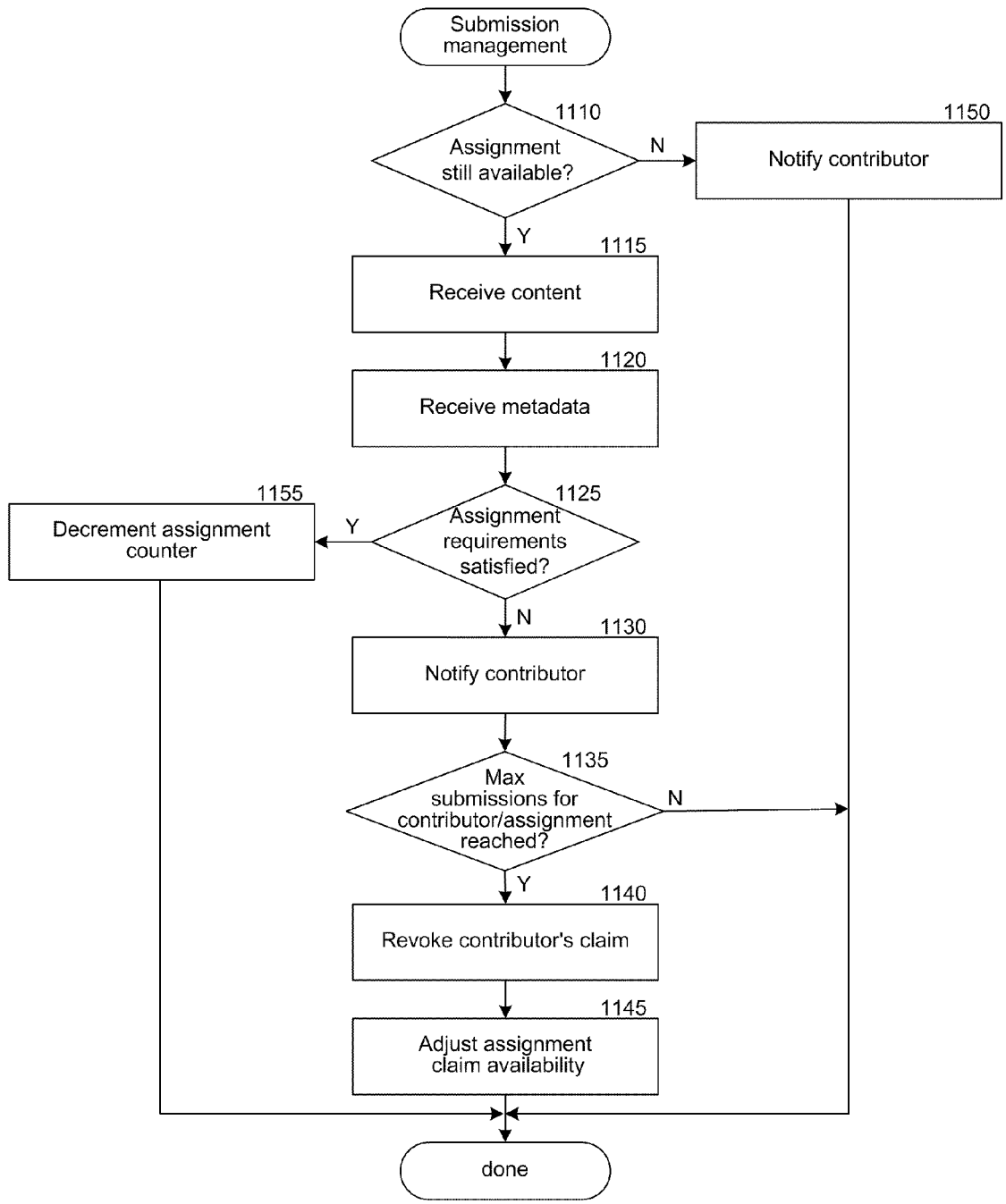
FIG. 11 is a flow diagram illustrating steps performed by a submission management module of the assignment system.

FIG. 11 is a flow diagram illustrating the processing of a submission management module 250 of the assignment system. The module is invoked when a contributor submits content to fulfill an assignment. In decision block 1110, if the assignment is still available, then the module continues at block 1115, else the module continues at block 1140. An assignment may become unavailable when, for example, a maximum number of pieces of content have been submitted for the assignment or when the assignment has expired. In block 1140, the module notifies the contributor that the assignment is no longer available and then completes. In block 1115, the module receives the content. For example, the module may instruct the contributor to upload an image, video, article etc. or provide a form through which a contributor can submit their content.

Figure 12:
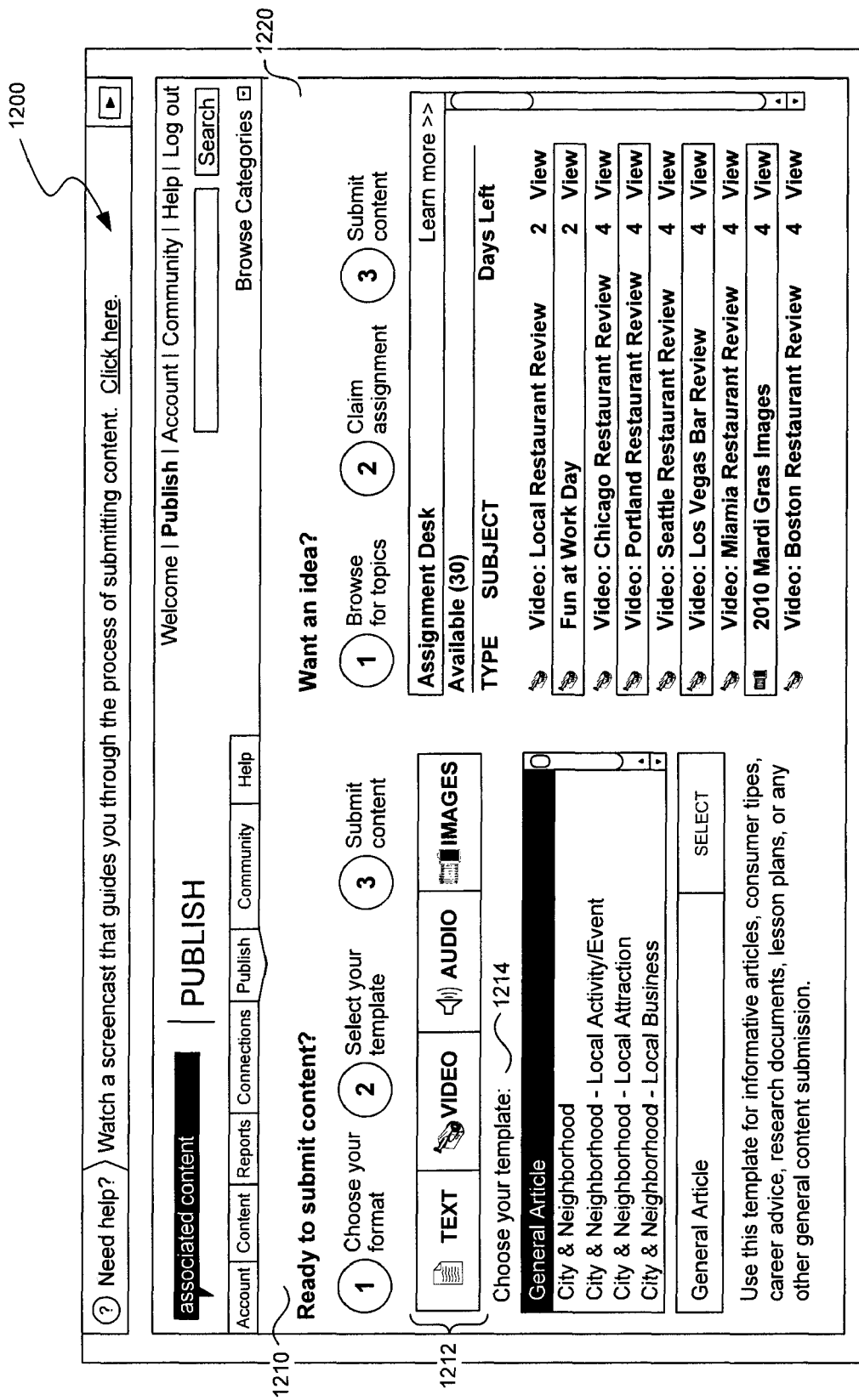
FIG. 12 is a representative interface illustrating a form through which a contributor can initiate a content submission process.

FIG. 12 is a representative interface illustrating a form 1200 through which a contributor can initiate a content submission process. Form 1200 includes a submit content pane 1210 where a contributor can select a content format or type via type selection panel 1212 and select a template for submitting content via template selection menu 1214. In this example, the form 1200 also includes an assignment desk pane 1220 where a contributor can browse for and claim assignments in a similar fashion to the assignment desk widget 630 depicted in FIG. 6A.

Figure 13:
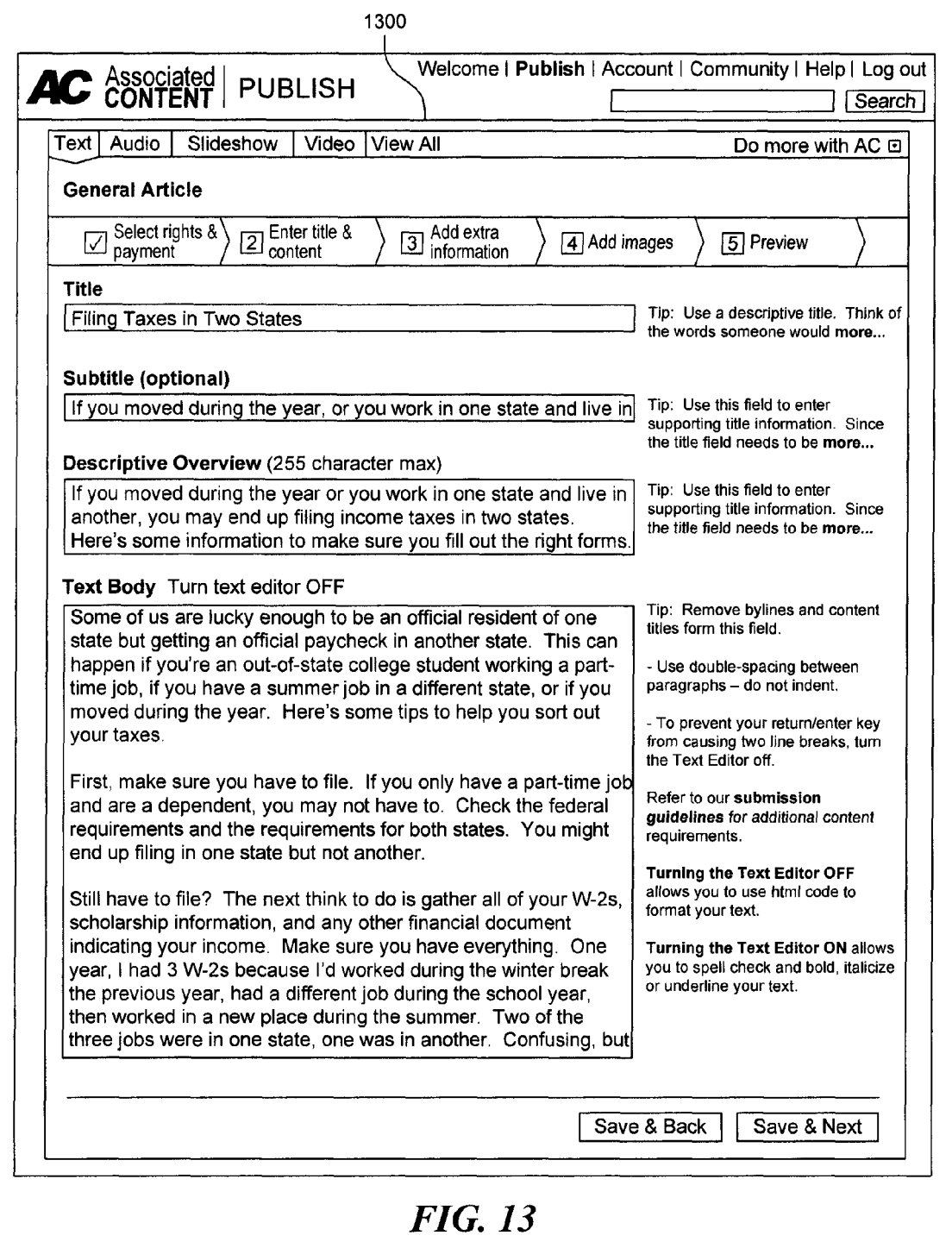

FIG. 13 is a representative interface illustrating a template 1300 through which a contributor may submit an article. In this example, the form includes fields for providing a Title, Subtitle, Descriptive Overview, and Text Body. The form may also include tools for formatting the article, checking spelling, ensuring that the article satisfies assignment requirements, etc.

Returning to FIG. 11, in block 1120 the submission management module 250 receives metadata associated with the content. The metadata may include information provided by the contributor or associated with the content, such as collaborators, recording dates, filming locations, recording locations, recording equipment, etc. or may include information generated by the module, such as the date/time the content was provided, the size of the content, etc.

In decision block 1125, the submission management module 250 determines if the submitted assignment satisfies the assignment definition. That is, the module determines if the materials submitted by the contributor and the attributes of the contributor satisfy all of the requirements of the assignment, such as content type, duration, quality, etc. If the assignment requirements are satisfied, then the submission management module continues at block 1155, else the module continues at block 1130. In some embodiments, the module may determine whether the requirements are satisfied automatically. For example, the module may determine whether the submitted content is a video less than thirty seconds in duration as opposed to an image. In some embodiment, the module may receive input from an operator or crowd-sourcing application as to whether the submitted content satisfies the assignment's requirements. For example, an operator may determine whether a submitted video meets various production and quality requirements. In block 1155, the module decrements the assignment submission counter, corresponding to the number of pieces of content remaining to be submitted to meet the quantity of content specified by the assignment's scope of effort, to indicate that a satisfactory piece of content has been submitted for the assignment and then completes.

If the assignment requirements are not satisfied in decision block 1125, processing continues to block 1130. In block 1130, the module notifies the contributor that the contributed content does not meet the assignment's requirements. The module may indicate to the contributor the one or more reasons why the contributed content does not been the requirements. In decision block 1135, if the maximum number of submission attempts from the contributor for the assignment has been reached, then the module completes, else the module continues at block 1140. For example, the scope of effort may indicate that a contributor only be allowed to submit content for a particular assignment no more than five times, whether or not the submitted content satisfies the assignment's requirements. For example, an assignment for "Houston, Texas Restaurant Reviews" may allow a maximum of five submissions per contributor to ensure that a single contributor does not monopolize content submission for the assignment. Furthermore, if a contributor repeatedly submits unsatisfactory content for an assignment, the module can prevent that contributor from submitting additional content for the assignment. In block 1140, the module revokes the contributor's claim so that another contributor may claim the assignment. In block 1145, the module adjusts the assignment's claim availability by, for example, incrementing the assignment's counter in the same amount that the counter was decremented when the contributor claimed the assignment. The module then completes.

As used in this application, the terms "module" and "system" are intended to refer to a computer-related entity, either hardware, a combination of hardware and software, software, or software in execution. For example, a module may be, but is not limited to being, a process running on a processor, a processor, an object, an executable, a thread of execution, a program, and a computer. By way of illustration, both an application running on a server and the server can be a module. One or more modules may reside within a process and/or thread of execution and a module may be localized on one computer and/or distributed between two or more computers. Those skilled in the art will further appreciate that the depicted flow charts may be altered in a variety of ways. For example, the order of the steps may be rearranged, steps may be performed in parallel, steps may be omitted, or other steps may be included.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A computing system for identifying potential contributors for creating content, the computing system comprising:
 a storage module that stores attribute values for each contributor of content;
 a generation module that generates assignments to produce content by:
  accessing a content storage area to identify clusters of stored content, each piece of stored content in a cluster being associated with a contributor;
  determining whether the performance of each content cluster has exceeded a performance threshold, the performance of a content cluster being based on the performance of the pieces of content in the content cluster when presented to consumers of content; and
  for each content cluster that exceeds the performance threshold, generating one or more assignments to produce content, each assignment having requirements including an indication of a topic, a content type, and a quantity value; and a targeting module that targets generated assignments to potential contributors by:

identifying common attribute values associated with at least two of the contributors of the content within the associated content cluster;

identifying potential contributors having attributes similar to the common attribute values associated with the contributors of the content within the associated content cluster; and sending an indication of the generated assignment to at least one of the identified potential contributors.

2. The computing system of claim 1, further comprising a management module that manages the acceptance of assignments by:

receiving an indication to claim the assignment from the at least one of the identified potential contributors; and adjusting an availability of the assignment.

3. The computing system of claim 2, further comprising a submission module that manages submissions by:

receiving content to fulfill the assignment from the at least one identified potential contributor; and determining whether the received content satisfies the requirements of the assignment.

4. The computing system of claim 1 wherein the generation module identifies clusters of stored content based on keywords associated with each piece of stored content.

5. The computing system of claim 4, wherein the generation module further compresses related content clusters into one content cluster.

6. The computing system of claim 1 wherein the stored attribute values for at least one of the contributors include values received from the contributor.

7. The computing system of claim 1 wherein the stored attribute values for at least one of the contributors include values collected from consumers.

8. The computing system of claim 1 wherein the stored attribute values for at least one of the contributors include values collected from third-party websites associated with the at least one of the content contributors.

9. The computing system of claim 1, wherein identifying common attribute values associated with at least two of the contributors of the content comprises analyzing the identified attribute values to generate weights associated with each attribute value, and identifying potential contributors having attributes similar to the common attribute values associated with the contributors is based on the weights associated with each attribute value.

10. The computing system of claim 1 wherein the performance threshold is based on a number of views of the two or more pieces of stored content.

11. The computing system of claim 1 wherein the performance threshold is based on the change in the number of views of the two or more pieces of stored content over a timeframe.

12. The computing system of claim 1 wherein the performance threshold is based on the revenue derived from the two or more pieces of stored content.

13. The computing system of claim 1 wherein the content type is selected from the group consisting of text, audio, video, and image.

14. A non-transitory computer-readable storage medium containing instructions that, when executed by a computer having a memory and a processor, cause the computer to perform a method for targeting requests for content to potential contributors, the method comprising:

maintaining a record of attributes that characterize a plurality of contributors of content;

determining characteristics of desired content based on the performance of two or more pieces of existing content, the two or more pieces of existing content being provided by one or more contributors;

identifying potential contributors for providing the desired content by:

analyzing the attributes of the one or more contributors that provided the existing content to determine one or more preferred attributes; and comparing the one or more preferred attributes with the attributes of the plurality of contributors of content to identify potential contributors that have the preferred attributes; and notifying the identified potential contributors of the desired content.

15. The non-transitory computer-readable storage medium of claim 14 wherein notifying the identified potential contributors includes sending to the identified potential contributors an indication of an assignment specifying the characteristics of the desired content.

16. The non-transitory computer-readable storage medium of claim 15, further comprising:

receiving from a first identified potential contributor a request to claim the assignment; and adjusting a claim availability of the assignment based at least in part on a likelihood that the first identified potential contributor will provide content responsive to the assignment.

17. The non-transitory computer-readable storage medium of claim 16, further comprising:

receiving content to fulfill the claimed assignment from the first identified potential contributor.

18. The non-transitory computer-readable storage medium of claim 17, further comprising:

determining whether the received content satisfies the characteristics of the desired content specified by the assignment.

19. The non-transitory computer-readable storage medium of claim 18, wherein the characteristics are selected from the group consisting of subject matter, type, length, and complexity level.

20. The non-transitory computer-readable storage medium of claim 18, further comprising:

in response to determining that the received content does not satisfy the characteristics of the desired content, notifying the first identified potential contributor that the received content does not satisfy the assignment; and revoking the claim of the first potential contributor to the assignment.

21. A computer-implemented method, performed by a computer having a memory and a processor, for identifying content contributors to produce desired content for a content distribution system, the computer-implemented method comprising:

maintaining a record of attributes that characterize a plurality of contributors of content;

receiving an assignment of desired content to produce, the desired content characterized by a topic and a type;

identifying potential contributors to fulfill the assignment by:

analyzing the assignment to determine two or more preferred attributes that would indicate that a contributor is suitable for producing the desired content; and comparing the two or more preferred attributes with the attributes of the plurality of contributors to identify potential contributors that have the two or more preferred attributes; and notifying the identified potential contributors of the assignment.

22. The computer-implemented method of claim 21 wherein the assignment includes at least one qualification for potential content contributors of the assignment.

23. The computer-implemented method of claim 22 wherein the at least one qualification is selected from the group consisting of occupation, location, and education.

24. The computer-implemented method of claim 21 wherein the assignment is generated automatically.

25. The computer-implemented method of claim 21 wherein the assignment is generated manually.

26. The computer-implemented method of claim 21 wherein the type is text, audio, video, or image.

27. The computer-implemented method of claim 21, further comprising:

receiving from a first identified potential contributor a request to claim the assignment; and adjusting a claim availability of the assignment based at least in part on a return rate associated with the first identified potential contributor.

28. The computer-implemented method of claim 27, further comprising:

receiving content to fulfill the claimed assignment from the first identified potential contributor.

29. The computer-implemented method of claim 28, further comprising:

determining whether the received content satisfies the characteristics of the desired content specified by the assignment.

30. The computer-implemented method of claim 29, further comprising:

in response to determining that the received content does not satisfy the characteristics of the desired content, notifying the first identified potential contributor that the received content does not satisfy the characteristics; and revoking the claim of the first potential contributor to the assignment.

\* \* \* \* \*